Figure 1:
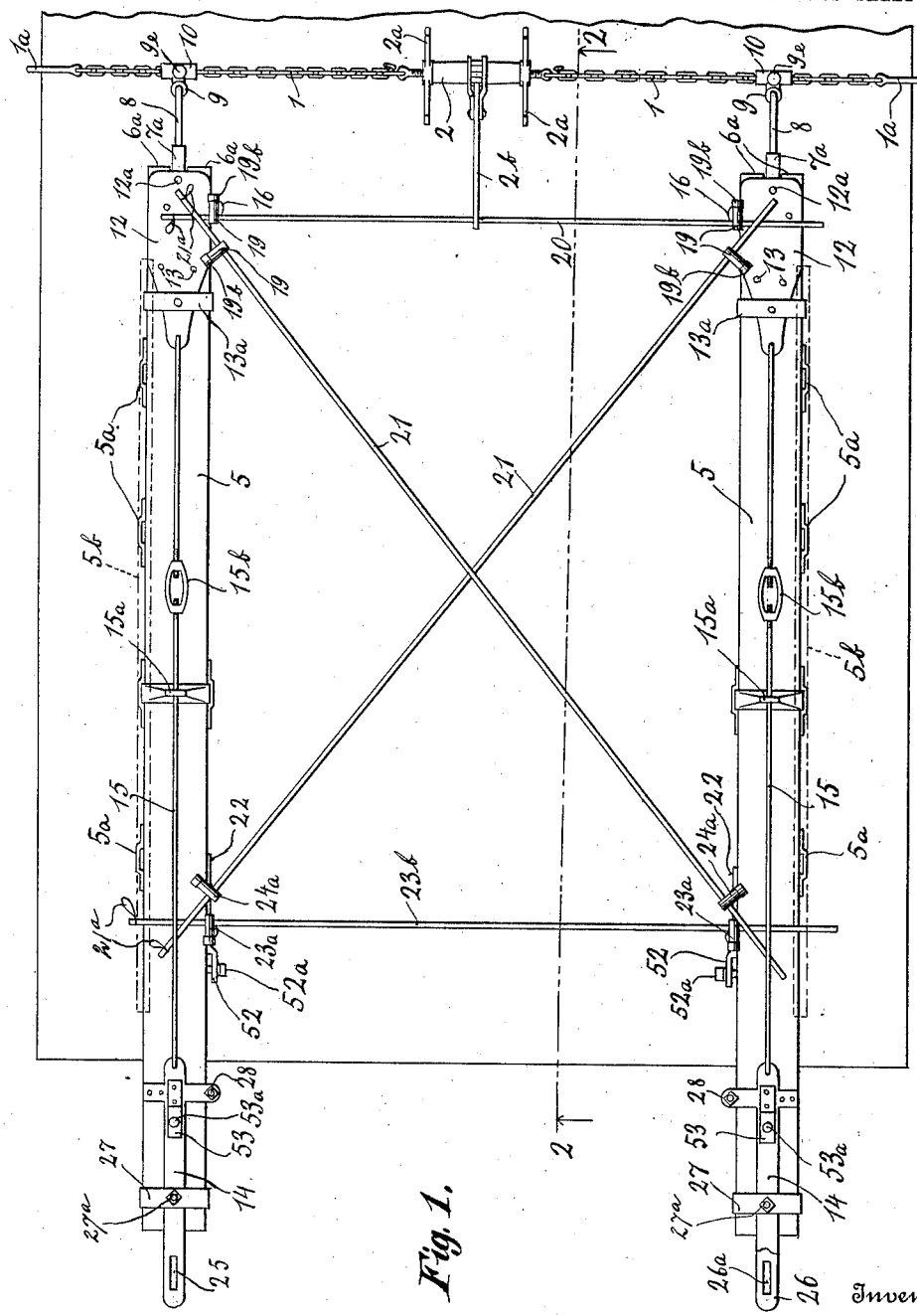

O. SCHWERIN.
SCAFFOLD.
APPLICATION FILED DEC. 4, 1911.
1,038,211.
Patented Sept. 10, 1912.
7 SHEETS—SHEET 2.
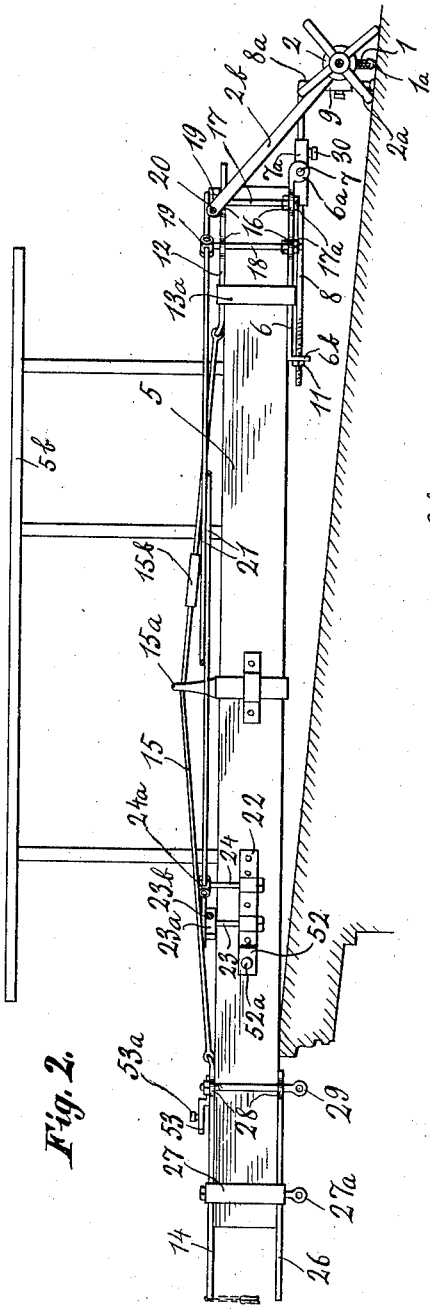
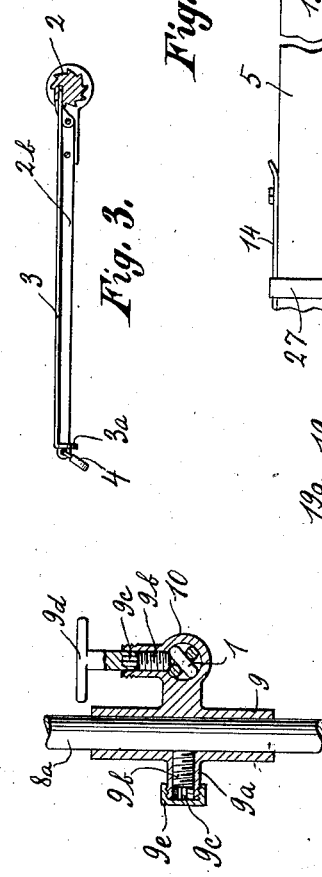
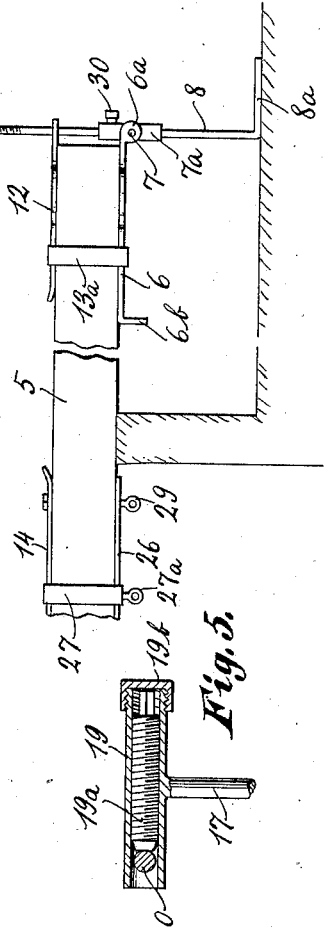
Witnesses
C Larson
M K evilson
Inventor
Oswald Schwerin.
By Milo B. Stevens & Co.
Attorneys

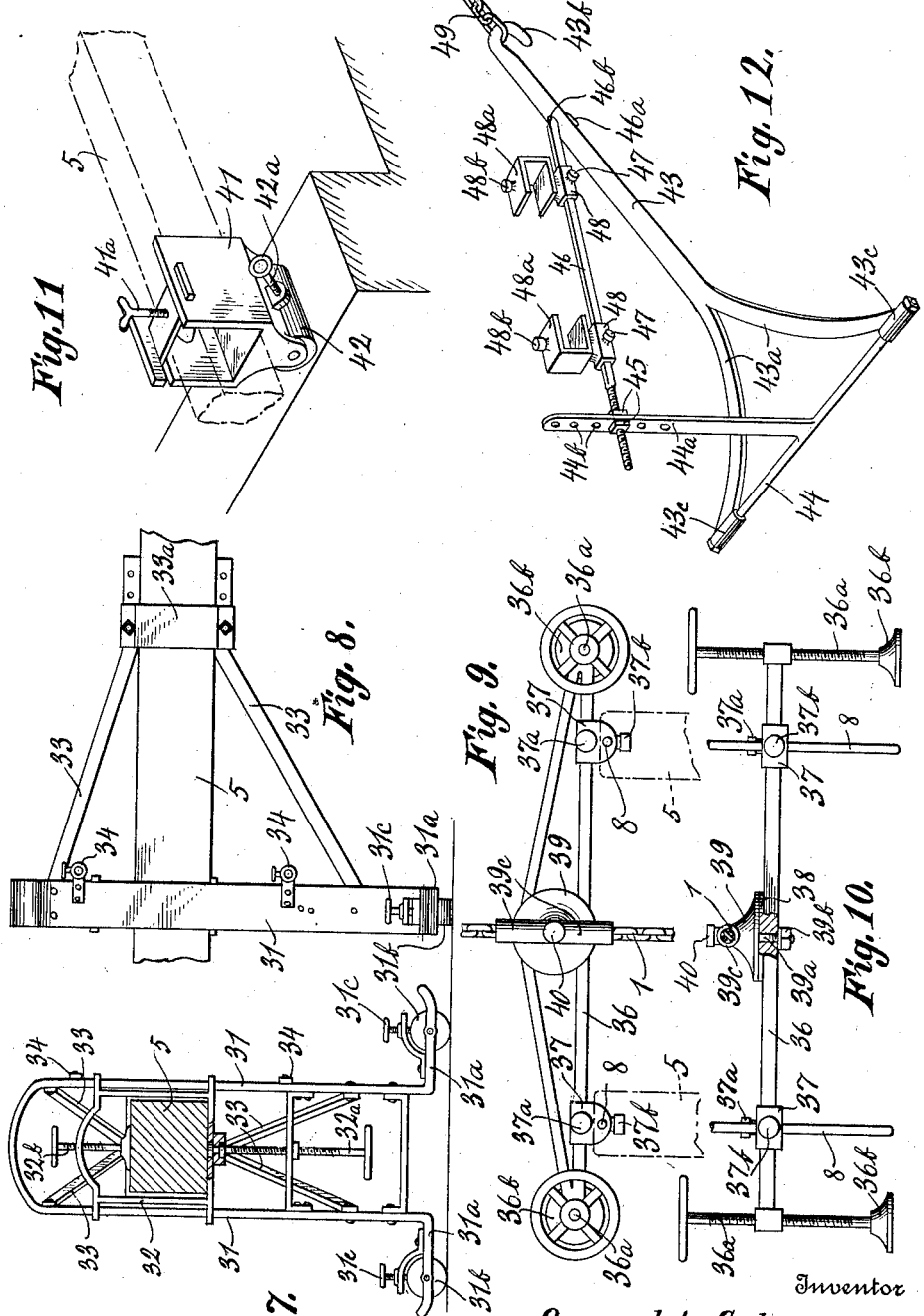

O. SCHWERIN.
SCAFFOLD.
APPLICATION FILED DEC. 4, 1911.
1,038,211.
Patented Sept. 10, 1912.
7 SHEETS—SHEET 4.
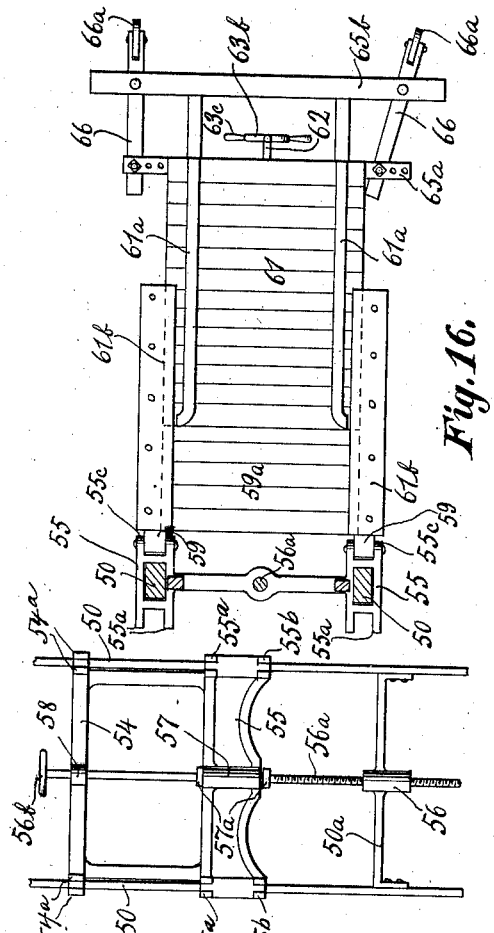
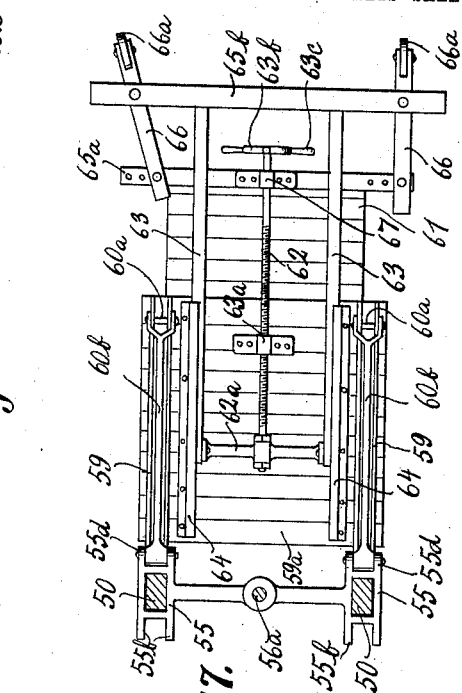
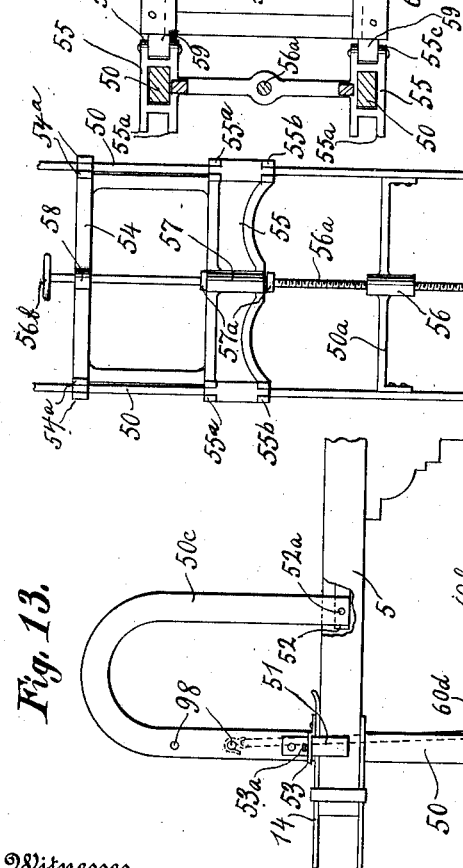
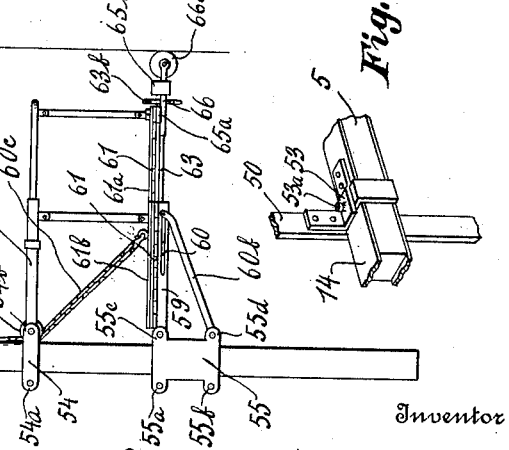
Witnesses
Inventor
Oswald Schwerin.
By
Attorneys O. SCHWERIN.
SCAFFOLD.
APPLICATION FILED DEC. 4, 1911.
1,038,211.
Patented Sept. 10, 1912.
7 SHEETS—SHEET 5.
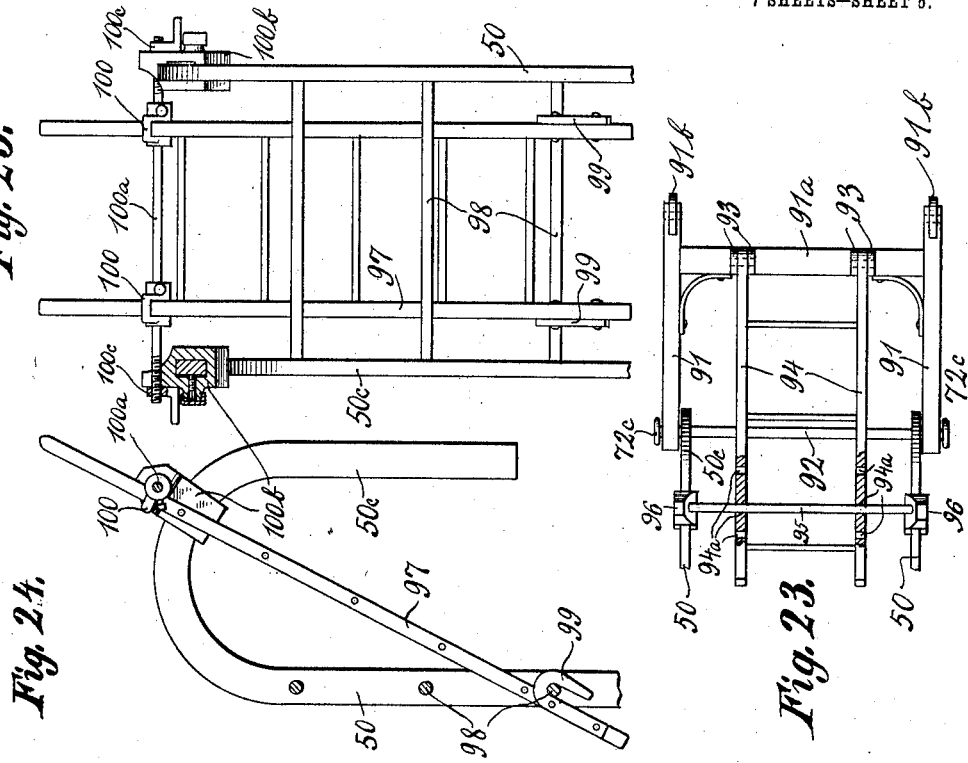
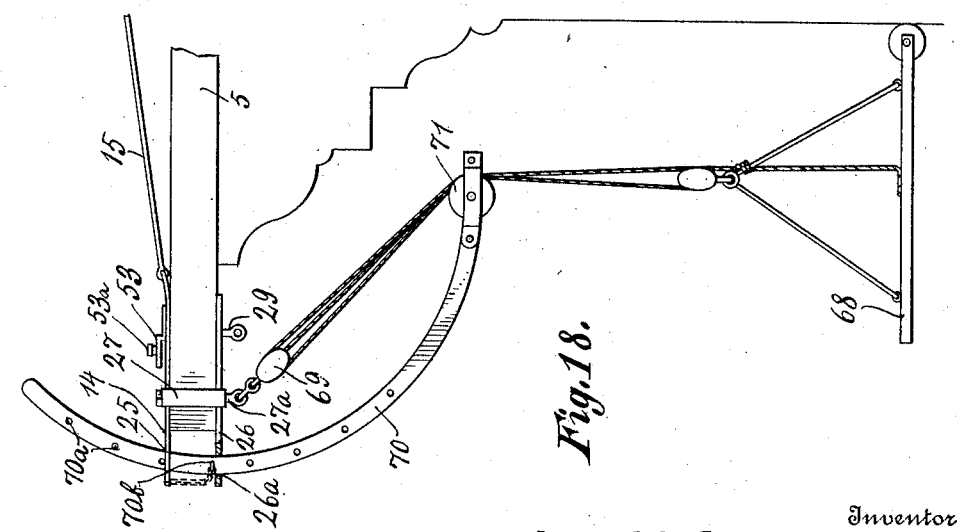
Witnesses
E Larson
Inventor
Oswald Schwerin,
By
Attorneys

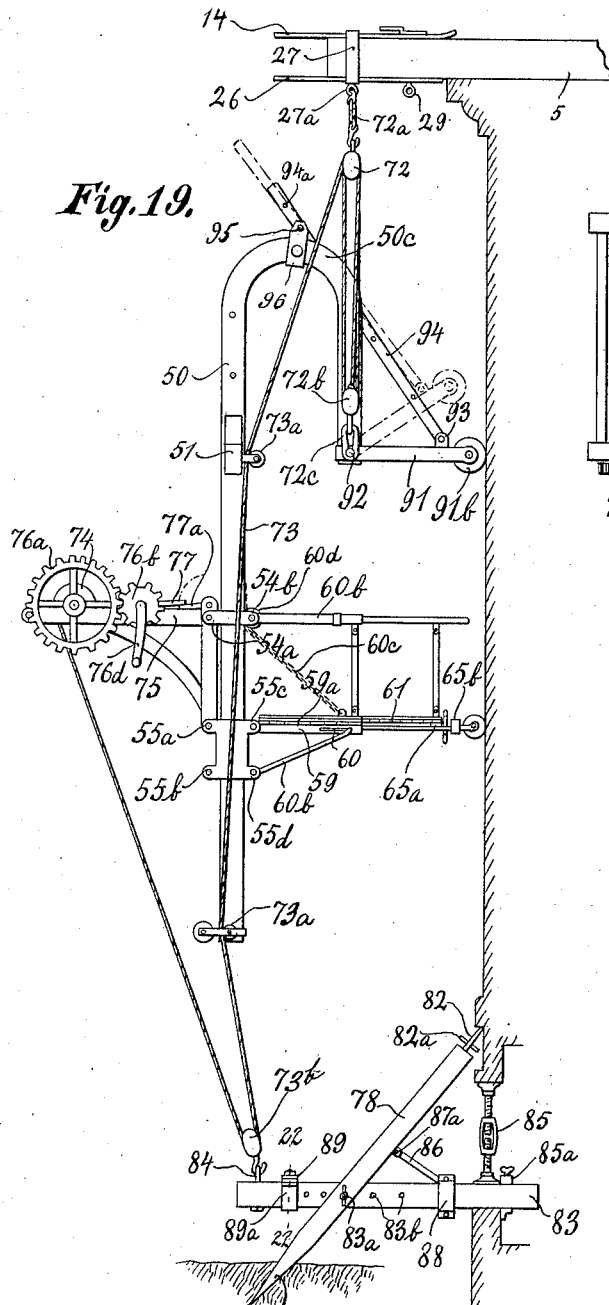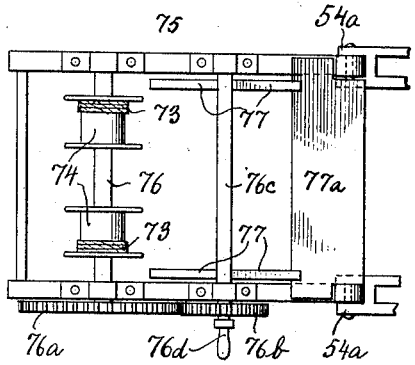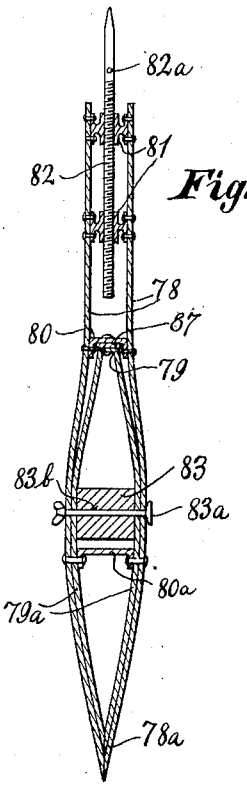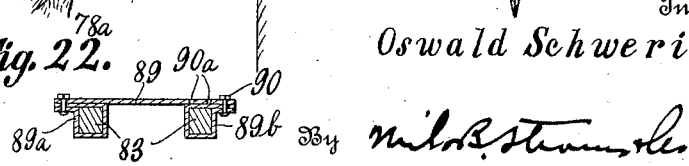

O. SCHWERIN.
SCAFFOLD.
APPLICATION FILED DEC. 4, 1911.
1,038,211.
Patented Sept. 10, 1912.
7 SHEETS—SHEET 7.
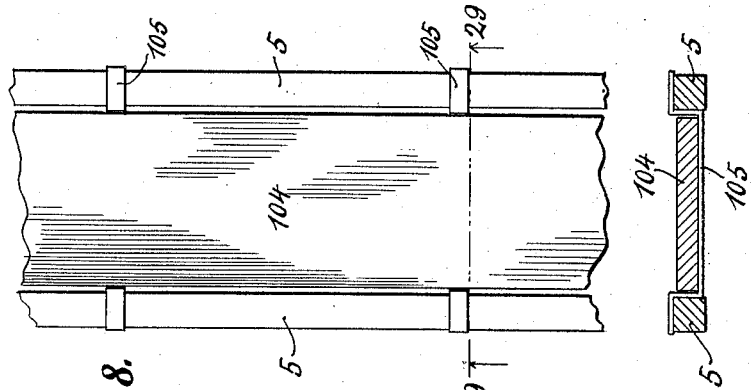
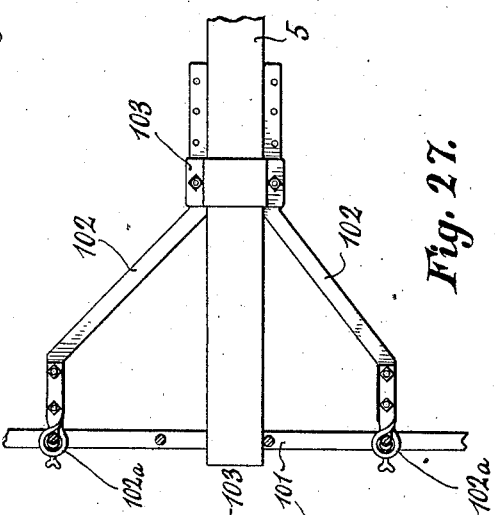
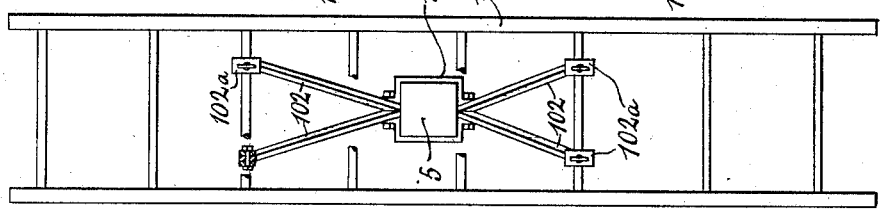
Witnesses
E Larson
M A Schneider
Inventor
Oswald Schwerin.
By
Attorneys

UNITED STATES PATENT OFFICE.

OSWALD SCHWERIN, OF CHICAGO, ILLINOIS.

SCAFFOLD.

1,038,211.  Specification of Letters Patent.  Patented Sept. 10, 1912.

Application filed December 4, 1911. Serial No. 663,781.

*To all whom it may concern:*

Be it known that I, OSWALD SCHWERIN, a citizen of the United States, residing at Chicago, in the county of Cook and State of Illinois, have invented certain new and useful Improvements in Scaffolds, of which the following is a specification.

This invention relates to scaffolds employed by painters and other artisans when working on a building, and its object is to provide novel and improved suspension or supporting devices for the scaffold, and also to provide for the adjustment of such devices so that the scaffold may be safely hung from buildings having variously constructed roofs.

Other objects and advantages of the invention will be pointed out in the detailed description appearing hereinafter, and in order that the invention may be better understood, reference is had to the accompanying drawings, forming a part of this specification, in which drawings—

Figure 1 is a plan view of the scaffold-supporting means. Fig. 2 is a cross section on the line 2—2 of Fig. 1. Fig. 3 is an elevation showing a locking means to be hereinafter described. Figs. 4 and 5 are sectional details of clamps used in connection with the apparatus. Fig. 6 is an elevation showing a different way of holding the scaffold-supporting beam. Figs. 7 and 8 are front and side elevations, respectively, of a support for the scaffold-supporting beam. Fig. 9 is a plan view of a modified attaching means for the holding chain of the scaffold-supporting beams. Fig. 10 is an elevation, partly broken away, of the parts shown in the preceding figure. Fig. 11 is a perspective view showing another device for supporting the beam. Fig. 12 is a perspective view of a device for leveling and holding the beams on a slanting roof. Fig. 13 is a side elevation of the scaffold. Fig. 14 is a detail in perspective showing the means for mounting the scaffold on the supporting beams. Fig. 15 is a front elevation of the scaffold platform. Fig. 16 is a top plan view of the platform. Fig. 17 is a bottom plan view of the platform. Fig. 18 shows another method of supporting the scaffold from the beams. Fig. 19 is a side elevation showing the scaffold disclosed in Fig. 13 arranged in a slightly different manner. Fig. 20 is a plan view of the hoisting mechanism used in connection with the structure shown in Fig. 19. Fig. 21 is a longitudinal, sectional view of an anchoring device. Fig. 22 is a section on the line 22—22 of Fig. 19. Fig. 23 is a plan view of the spacing device shown in Fig. 19. Figs. 24 and 25 are side and front elevations of a ladder used in connection with the structure shown in Fig. 19 when a slanting roof part, ornament, or other structure is reached. Figs. 26 and 27 are front and side elevations showing a ladder supporting means. Fig. 28 is a plan view showing means for mounting a plank between the roof beams, and Fig. 29 is a cross section on the line 29—29 of Fig. 28.

Referring specifically to the drawings, 1 denotes two chains, each having at one of its ends a large hook $1^a$ to catch over the edge of a roof as shown in Fig. 1. The other ends of the chains are connected to a jack-screw 2 whereby they are stretched tight across the roof. The jack-screw is mounted on legs $2^a$, and is operated by a ratchet lever $2^b$ having an eye through which is passed a rod to be presently described, for locking said lever. A different locking means for the lever is shown in Fig. 3, the same comprising a latch rod 3 slidably mounted lengthwise on the lever and having an eye $3^a$ through which the lever loosely passes. A padlock 4 applied to the lever in front of the end of the rod having the eye, prevents withdrawal of the rod to unlock the lever. Each chain 1 holds a beam 5 from which the scaffold, to be presently described, is suspended, and as the structure of said beams and the parts associated therewith are alike, only one need be described. The beam carries clips $5^a$ on one side for supporting a railing $5^b$, the latter being shown in full lines in Fig. 2 and dotted in Fig. 1. To the bottom of the beam, at the rear end thereof, or that end which is nearest to the chain, is fastened a plate 6 which projects for a short distance from the beam and has on said projecting end knuckles $6^a$. The other end of the plate has a downward bend $6^b$. Through the knuckles $6^a$ passes a hinge rod 7 carrying a sleeve $7^a$, the latter extending at a right angle to the rod. In the sleeve $7^a$ is mounted a rod 8 having at one of its ends a right angle bend $8^a$ on which is mounted a clamp which is engageable with the chain. This clamp comprises two tubular body portions 9 and 10, respectively. The bend $8^a$ passes through the body portion 9, and the latter has a laterally extending branch 9ª provided with a threaded bore which opens into the bore of said body portion. In the bore of the branch is mounted a plug 9ᵇ which is adapted to be screwed inwardly so that its inner end may come in contact with the bend 8ª, thereby locking the clamp in adjusted position on the bend. The outer end of the screw-plug has a lug 9ᶜ engageable by a key 9ᵈ, for screwing and unscrewing said plug. The key is removable, so that a cap 9ᵉ may be screwed over the outer end of the branch to close the same for protection from rain, etc. This closure also prevents the clamp from being tampered with. A similar device as herein-described is employed for locking the portion 10 of the clamp to the chain.

The clamp herein described, together with the rod 8, provide a simple and secure connection between the beam 5 and the chain 1. The rod extends horizontally, and the bend 8ª extends downwardly and has its lower end in engagement with the roof, thereby holding the rear end of the beam spaced from the roof. The end of the rod 8 opposite the bent end thereof, passes through an aperture in the bend 6ᵇ and is screw-threaded to receive a nut 11, which screws against said bend and thus serves to hold the rod in adjusted position within the sleeve, it being understood that the rod is slidable within the sleeve 7ª for the purpose of adjustment.

On top of the beam 5, at the rear end thereof, is mounted a plate 12 which projects for a short distance from the beam and has in said projecting portion an aperture 12ª which is for a purpose to be presently described. The plate 12 and the plate 6 are secured to the beam by screws or other suitable fastening means 13, as well as by a strap 13ª passing around the beam.

On top of the beam 5, at the forward end thereof, is mounted a plate 14 having an upturned inner end to which is connected one end of a truss-rod 15, the other end of which is connected to the inner upturned end of the plate 12. Intermediate its ends the truss-rod passes over a strut 15ª rising from the beam. A turn buckle 15ᵇ is provided for tightening up the truss-rod.

On one edge of the plates 6 and 12 are vertically alined perforated ears 16 through which pass vertical stems 17 and 18, respectively, secured at their lower ends, by nuts 17ª, to the ears of the plate 6. The stem 17 carries at its upper end a clamp comprising a tubular member 19 having a threaded bore to receive a screw plug 19ª and a transverse aperture intersecting said bore. Through the aperture passes a brace rod 20 which extends across to the other beam 5 and to which it is connected in a similar manner. The plug 19ª is adapted to be screwed against the rod, and is operated by a key in the same manner as the plug of the first described clamp. The member 19 also has a closure 19ᵇ.

A clamping member similar to the member 19 is carried by the stem 18 and engages a brace rod 21 also extending over to the other beam 5 and connected thereto in the same manner as the rod 20. It will be noted that the clamps of the rods 20 and 21 are in different vertical planes, so as to prevent interference of the rods. The rod 20 extends straight and the rod 21 diagonally between the beams, and to facilitate the handling of said rods they may be provided with a loop 21ª at one of their ends. The rod 20 may be passed through the eye of the ratchet lever 2 for locking the same.

To the forward end of the beam 5, on one side thereof, is mounted a bracket 22 in which are supported stems 23 and 24 carrying clamps 23ª and 24ª, respectively, of brace rods 23ᵇ and 24ᵇ, said clamps and brace rods being constructed and arranged in the same manner as the ones already described.

The front end of the plate 14 projects from the corresponding end of the beam 5 and has a slot 25 which is for a purpose to be presently described. To the bottom of the forward portion of the beam is secured a plate 26 which also projects from the beam and has in its projecting end a slot 26ª.

Around the beam 5 and over the plates 14 and 26 passes a band 27 which assists to secure said plates to the beam. An eye bolt 27ª passes vertically through the beam and the plates as well as through the band. The eye of this bolt is located beneath the beam. On one edge of the plates 14 and 26 are vertically alined perforated ears 28 through which passes an eye-bolt 29, the eye thereof being also located beneath the beam.

Inasmuch as the sleeve 7ª is hinged to the beam 5, it may be adjusted to place the rod 8 in vertical position, as shown in Fig. 6. In this position the bend 8ª is at the bottom of the rod and engages the roof. A screw plug 30 is provided for locking the rod in the sleeve. By placing the rod in this position the rear end of the beam may be elevated sufficiently to clear chimneys or other obstructions on the roof, or a high front wall or cornice as shown.

If the beam 5 must be held high above the roof, the device shown in Figs. 7 and 8 is used. This device comprises a frame consisting of spaced upright side pieces 31 connected at the top and having feet 31ª which are fitted with wheels 31ᵇ provided with brakes 31ᶜ. Between the side pieces is slidably mounted a support 32 on which the beam is held. A screw 32ª is provided for adjusting the support, and the latter is provided with a screw clamp 32ᵇ for holding the beam. By this device the beam may be readily raised or lowered as desired and also moved sidewise on the roof, the wheels 31ᵇ facilitating the shifting about of the frame in which the support is mounted. Braces 33 are fastened to the side pieces 31 and extend to the beam 5 to which they are made fast by an adjustable clamp 33ᵃ. A clamp 34 is also mounted on each side piece 31 for use in tightening rods passing from this structure to another like it which supports the other beam 5.

The device shown in Figs. 9 and 10 is used in connection with two beams 5 when the chains 1 cannot be fastened to the roof lengthwise or sidewise, but must be secured diagonally to some steeple, chimney, or other object rising from the roof. As shown, a rigid frame 36 is provided, which is mounted at its ends on screws 36ᵃ having feet 36ᵇ whereby they are supported in upright position on the roof. On one of the longitudinal members of the frame, said member being rectangular in cross-section, are slidably mounted two blocks 37, which may be locked in adjusted position by screw plugs 37ᵃ. These blocks have vertical openings to receive the rods 8, the latter being locked in said openings by screw plugs 37ᵇ. At the center of the frame is a bearing 38 which supports a block 39 from the bottom of which extends a screw stem 39ᵃ which passes through an aperture in the bearing and receives a nut 39ᵇ whereby the block is rigidly held in place on the bearing. At the top of the block are two alined tubular arms 39ᶜ through which the chain 1 passes and by means of a screw plug 40 engageable with the chain, the latter is securely held, the structure and arrangement being substantially the same as the chain clamps hereinbefore described. The block is rotatable, in view of which it may be adjusted to suit the position of the chain.

Fig. 11 shows a device for supporting the front end of the beam 5 on a cornice like structure. This device comprises a shoe 41 in which the beam rests and is held by clamping screw 41ᵃ. The shoe is mounted on a roller 42 to facilitate its adjustment, and said roller is provided with a brake 42¹.

Fig. 12 shows a leveling and holding means for the beams 5 on a slanting roof. This device comprises a longitudinal bar 43 having diverging branches 43ᵃ at one of its ends and a hook 43ᵇ at its other end. The extremities of the branches are formed with hinge knuckles 43ᶜ in which is pivotally supported a rod 44 having intermediate its ends an outstanding arm 44ᵃ provided with a series of perforations 44ᵇ, through a selected one of which is passed, and secured by nuts 45, one end of a rod 46 having at its other end a hook 46ᵃ which is connected to the bar 43 by passing through an aperture 46ᵇ therein. That portion of the rod which extends between the bar 43 and the arm 44ᵃ is angular in cross-section and on the same are mounted and held in adjusted position, by screw plugs 47, two sleeves 48 which are formed with U-clamps 48ᵃ engageable with the beams 5, screw plugs 48ᵇ being provided for securing the beams. The bar 43 is held in place on the roof by means of a chain 49 connected to the hook 43ᵇ. Any other suitable supporting means for the bar may be provided. By the adjustable connection between the arm 44ᵃ and the rod 46, the parts may be adjusted to roofs of different slants.

The scaffold comprises a platform which is mounted to slide up and down on a ladder-like structure which is hung from the forward ends of the beams 5. This ladder-like structure comprises stiles 50 which are rigidly connected in spaced parallel relation by cross braces or rungs 50ᵃ, and are formed at their upper ends into hooks 50ᶜ. To the outer sides of the stiles, near the top thereof, are secured hook shaped brackets 51 which are adapted to engage over the beams 5, it being understood of course that the beams must first be spaced apart a distance corresponding to the space between the stiles. On the beam 5 is a bracket 52 having an end portion which is spaced from the side of the beam and into the space between said parts the lower extremity of the hook 50ᶜ fits. The bracket carries a screw 52ᵃ adapted to screw through the part 50ᶜ and abut against the side of the beam. That portion of the hook 51 which extends across the top of the beam fits under a bracket 53 secured on top of the plate 14. This bracket also carries a screw 53ᵃ adapted to be screwed down against that part of the hook which is beneath the bracket. The bracket 52 is integral with the part 22.

By the herein described devices the stiles 50 are rigidly secured to the beams 5 and a firm and safe support for the scaffold is had.

The platform which is mounted on the stiles 50 is constructed as follows: On the stiles is slidably mounted a frame having upper and lower transversely extending members 54 and 55, respectively, the ends of said members having vertical openings through which the stiles loosely pass. At the front and rear of the end portions of the member 54 are outstanding perforated ears 54ᵃ and 54ᵇ, respectively, and at the front of the end portions of the member 55 are vertically spaced perforated ears 55ᵃ and 55ᵇ, respectively. Similar ears 55ᶜ and 55ᵈ are at the rear of the end portions of the member 55. On the rung 50ᵃ is a stationary nut 56 through which is threaded a vertical screw 56ᵃ having at its upper end a hand wheel 56ᵇ whereby it is operated. The frame member 55 has a bearing 57 through which the screw loosely passes. Above and below the bearing 57 the screw carries fixed collars 57ᵃ engageable with said bearing. Upon operating the screw, the collars, by their engagement with the bearing, cause the frame to slide up or down on the stiles 50. The screw also passes through a bearing 58 on the frame member 54. To the ears 55$^c$ are pivotally connected channel bars 59 to which is secured the flooring 59$^a$ of the platform. The flanges of the channel bars extend downwardly and have longitudinal slots 60 in which work pins 60$^a$ carried by one end of braces 60$^b$, said ends of the braces being forked to straddle the flanges. The braces extend downwardly and are pivotally secured at their outer ends to the ears 55$^d$. Inasmuch as the bars 59 are pivoted, the platform may be folded upwardly against the stiles, the pivoted and slotted connection of the braces permitting such movement. The platform has a folding railing 60$^b$ extending around the same. To the platform is also connected one end of a chain 60$^c$ having its other end connected to one of the rungs of the stiles 50. The part 54 carries a guide pulley 60$^d$ for the chain.

The platform 59$^a$ carries an extension comprising a flooring 61 which is connected by two spaced longitudinal bars 61$^a$. The side edges of the flooring 61 extend under and work in guides 61$^b$ secured to the top of the platform. The extension is adjustable inwardly and outwardly of the platform by a screw 62 fastened at one end to a bearing 62$^a$ carried by two spaced longitudinal beams 63 carried by the extension and located beneath the platform 59$^a$. The screw is also threaded through a nut 63$^a$ rigidly secured to the under side of the platform. The screw is provided with an operating wheel 63$^b$ having radially extending arms 63$^c$, so that it may be actuated by the foot of a person standing on the platform.

On the under side of the platform 59$^a$ are guides 64 in which are slidably mounted the spaced longitudinal beams 63 which are connected a short distance from their outer ends by a cross bar 65$^a$ and at their extremities they are connected to a cross bar 65$^b$ which is spaced a suitable distance from the cross bar 65$^a$. The cross bar 65$^b$ carries putlogs 66 which are adjustably connected to the ends of the cross bar 65$^a$. The putlogs carry rollers 66$^a$ at their outer ends. The end board of the flooring which forms the extension is fastened on top of the cross bar 65$^a$. It will therefore be seen that the beams 63 are connected to the extension and are adjustable therewith by the screw 62. On the under side of the cross bar 65$^a$ is a bearing 67 for the screw.

Fig. 18 shows a scaffold 68 supported by a hoisting tackle, the standing block 69 of which is hung on the eye bolt 27. Through the slots 25 and 26$^a$ passes a curved bar 70 having a series of perforations 70$^a$ to receive pins 70$^b$ for holding the bar in adjusted position. The bar curves inwardly toward the wall of the building, and carries at its lower end a pulley 71 over which the tackle ropes pass.

Fig. 19 shows the first described scaffold structure suspended from the beams 5 by a hoisting tackle, the standing block 72 thereof being directly connected to the eyebolt 27, or by a chain 72$^a$. The running block 72$^b$ of the tackle is connected to a clevis 72$^c$ carried by the hooked end 50$^c$ of the stile 50. It may be here stated that each stile is provided with a hoisting tackle. The fall rope 73 of the tackle extends downwardly along the stile over guide pulleys 73$^a$ thereon and passes over a guide pulley 73$^b$, and thence passes upwardly to a drum 74 mounted on a supporting frame 75 carried by the supporting frame of the platform 59$^a$, on which drum the fall rope is coiled. The frame 75 is fastened to the supporting frame of the platform by the ears 55$^a$ or 55$^b$ and the ear 54$^a$. The shaft 76 of the drum 74 carries a spur gear 76$^a$ which is in mesh with a pinion 76$^b$ on a shaft 76$^c$ mounted in bearings on the frame 75 and provided with a crank handle 76$^d$. The shaft 76$^c$ is fitted with radial arms 77 into the path of which extends a pivoted leaf 77$^a$ for locking said shaft. The leaf may be swung out of the way of the arms to release the shaft 76$^c$ if the scaffold is to be raised or lowered, which is done by winding or unwinding the fall rope.

The structure shown in Figs. 19 and 21 is employed for anchoring the pulley 73$^b$. Referring specifically to these views, 78 denotes two spaced metal strips which are welded together at one of their ends and pointed, as indicated at 78$^a$ so that said point may be driven into the ground. Between these strips is located a second metal strip which is bent squarely midway between its ends as indicated at 79, to form two branches 79$^a$ which are welded together with the pointed ends of the strips 78. The branches 79$^a$ run up to about the middle portion of the strips 78. Between the strips 78, at the bend 79, is a spacing bar 80, and a similar bar 80$^a$ is located between branches 79$^a$ where they are welded to the strips 78. Between the upper ends of the strips 78 are rigidly mounted blocks 81 having threaded openings into which screws a stem 82 which projects from the upper ends of the strips 78 and has its outer end pointed. This screw stem is adapted to be stuck under a ledge on the building or to engage the wall of the building, and its outer end carries a cross-arm 82$^a$ whereby it may be rotated to be advanced or retracted. The point 78$^a$ is generally first stuck into the ground, and the screw stem is then run out to tightly wedge the device in place. Between the strips 78$^a$ and the branches 79$^a$ extends a horizontal beam 83 which is locked thereto by a transverse pin 83$^a$ passing through said parts and through a selected one of a series of perforations 83$^b$ in the beam. The beam carries an eye bolt 84 to which the pulley 73$^b$ is connected. The beam 83 extends through a window or other opening in the house and is fastened to the sill by a screw expander 85 and a sill clamp 85$^a$. In order to further secure the beam to the post formed by the parts 78 and the ones associated therewith, a brace 86 is provided, one end being pivotally connected to the post and the other end rigidly fastened to the beam. The pivotal connection permits adjustment of the brace according to the angle between the post and the beam, the former extending at an acute angle to the latter. To the bend 79 is secured a bracket member 87 to which the brace is pivoted as indicated at 87$^a$. The brace is fastened to the beam by a clamp 88 which is adjustable lengthwise on the beam.

Inasmuch as two hoisting tackles are used, two of the herein described pulley supports will be provided, and in order to rigidly keep the two beams 83 at the desired distance apart, said beams are connected by a cross bar 89, one end of which is fastened to one of the beams by a strap 89$^a$, and its other end being adjustably connected to the other beam by a strap 89$^b$. The adjustable connection is made by a bolt 90 connected to the strap 89$^b$ and passing through a selected one of a series of bolt holes 90$^a$ in the cross bar.

A device for spacing the scaffold from the side of the building is provided when said scaffold is supported as shown in Fig. 19. This spacing device is constructed and arranged as follows: A frame composed of side bars 91 connected at one end by a cross bar 91$^a$ is provided, said end of the side bars carrying rollers 91$^b$ which are in contact with the wall of the building. This frame is horizontally disposed and extends outwardly from the end of the hooks 50$^c$ of the stiles 50, the inner end of the frame being pivotally mounted on a cross rod 92 carried by said hooks. On the cross bar 91$^a$ are ears 93 to which are pivotally connected the lower ends of the stiles 94 of a ladder-like structure. The upper ends of the stiles 94 have apertures 94$^a$ through a selected pair of which is adapted to be passed a rod 95 supported by clamps 96 mounted on the bend of the stiles 50. Suitable screw plugs are provided for locking the clamps. Upon releasing the stiles 94, the latter may be slid back and forth, whereby the bars 91 are swung in a vertical plane as shown by dotted lines in Fig. 19, and the scaffold is thus adjusted toward or from the wall of the building.

When a slanting roof part, ornament or other structure is reached, a ladder 97 is mounted on the stiles 50. Figs. 24 and 25 show the means for securing the ladder. The upper portion of the stiles carry rungs 98 to one of which the lower end of the ladder is connected by means of hooks 99 on the latter. The upper end of the ladder is connected by U-clamps 100 to a cross-rod 100$^a$ carried by clamping blocks 100$^b$ mounted on the bend of the stiles 50, said clamping blocks being secured to the stiles in the same manner as the blocks 96, and having openings to receive the rod 100$^a$ which latter is held in the clamping blocks by nuts 100$^c$ screwed on the ends of the rod.

The several screw plugs herein described are adapted to be operated by keys, the arrangement being similar to that of the first described chain clamps.

Figs. 26 and 27 show a support for a ladder 101, said support being carried by one of the roof beams 5 and comprising vertically spaced pairs of arms 102 extending divergingly from the beam and carrying clamps 102$^a$ at their extremities engageable by two rungs of the ladder. The arms are connected to the beam by an adjustable clamp 103.

Figs. 28 and 29 show how the roof beams 5 may be employed to support a planking 104 which is laid on stirrups 105 extending between and supported by the beams.

I claim:—

1. A support for scaffolds comprising a member having attaching means, a scaffold supporting beam, a tubular member carried by the beam, a rod carried by the tubular member and having a bend, and a clamp mounted on the bend of the rod and engageable with the first mentioned member.

2. A support for scaffolds comprising a member having attaching means, a scaffold supporting beam, a tubular member hinged to the beam, a rod carried by the tubular member, and having a bend, and a clamp mounted on the bend of the rod and engageable with the first mentioned member.

3. A support for scaffolds comprising a member having attaching means, a scaffold supporting beam, a plate mounted on one end of the beam and having a bend at one of its ends, a tubular member hinged to the other end of the plate, a rod passing loosely through the tubular member and through the bend of the plate, one end of the rod having a bend, a nut screwed on the rod against the bend of the plate, and a clamp mounted on the bend of the rod and engageable with the first mentioned member.

4. A support for scaffolds comprising a member having attaching means, a scaffold supporting beam, a tubular member carried by the beam, a rod carried by the tubular member and having a bend and a clamp mounted on the bend of the rod, said clamp comprising tubular members arranged at an angle to each other, the bend of the rod passing through one of the tubular members, and the first mentioned member passing through the other tubular member, and screw plugs carried by the tubular member and engageable with the parts passing therethrough.

5. A support for scaffolds comprising a pair of parallel scaffold supporting beams, fastening means therefor, stems carried by the beams, clamps on the stems, and brace rods extending between the beams, said brace rods being secured by the clamps.

6. A support for scaffolds comprising a pair of parallel scaffold supporting beams, fastening means therefor, stems carried by the beams, tubular members on the stems, said members having transverse apertures, brace rods extending between the beams and passing through the transverse apertures, and plugs screwed into the tubular members against the rods passing through the transverse apertures.

7. A support for scaffolds comprising a supporting frame, scaffold supporting beams connected to said frame, and an anchoring device comprising a chain, a rotatable member mounted on the frame and having an opening through which the chain passes, and a plug screwed against the chain within the aforesaid opening.

8. An anchoring device comprising a beam, and supporting means for the beam comprising a post extending at an angle to the beam, and having one of its ends pointed and carrying at its other end a lengthwise adjustable pointed stem, means for connecting the beam to the post, and means for clamping the beam to a support.

9. An anchoring device comprising a beam, means for clamping the beam to a support, a post extending at an angle to the beam, and having one of its ends pointed and carrying at its other end a lengthwise adjustable pointed stem, means for connecting the beam to the post, and an adjustable brace between the post and the beam.

10. An anchoring device comprising a beam, a support for one end of the beam, a post supporting the other end of the beam, said post extending at an angle to the beam, and having one of its ends pointed, and provided at its other end with a lengthwise adjustable pointed stem, and an adjustable brace between the post and the beam.

11. A scaffold comprising parallel stiles connected in spaced relation, a platform carried by the stiles, a pivoted spacing device carried by the stiles, and means for holding said spacing device adjusted.

12. A scaffold comprising parallel stiles connected in spaced relation, a platform carried by the stiles, a pivoted spacing device carried by the stiles, pivoted rods carried by the spacing device, and holding means mounted on the stiles and engaging the aforesaid rods.

13. A scaffold comprising parallel stiles connected in spaced relation, a platform carried by the stiles, clamps carried by the upper ends of the stiles, and a ladder supported at its lower end on one of the connections between the stiles, and at its upper end by the aforesaid clamps.

In testimony whereof I affix my signature in presence of two witnesses.

OSWALD SCHWERIN.

Witnesses:
ROSE M. MINWEGEN,
H. G. BATCHELOR.

Copies of this patent may be obtained for five cents each, by addressing the "Commissioner of Patents, Washington, D. C."